United States Patent [19]

Ernst et al.

[11] Patent Number: 4,570,773

[45] Date of Patent: Feb. 18, 1986

[54] ANTIFRICTION-BEARING THROWOUT, PARTICULARLY FOR AUTOMOTIVE CLUTCHES

[75] Inventors: Horst M. Ernst, Eltingshausen; Manfred Brandenstein, Eussenheim; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 371,440

[22] Filed: Apr. 23, 1982

[30] Foreign Application Priority Data

Apr. 23, 1981 [DE] Fed. Rep. of Germany ....... 3116168

[51] Int. Cl.$^4$ ............................................. F16D 23/14
[52] U.S. Cl. .................................. 192/98; 192/110 B
[58] Field of Search .............. 192/98, 110 B; 308/235, 308/DIG. 4

[56] References Cited

U.S. PATENT DOCUMENTS

| 3,815,715 | 6/1974 | Maucher ..................... 192/110 B X |
| 3,920,107 | 11/1975 | Umbacher ............................. 192/98 |
| 4,026,398 | 5/1977 | Matyschik et al. ................... 192/98 |
| 4,093,053 | 6/1978 | Ernst et al. ............................ 192/98 |
| 4,306,641 | 12/1981 | Olschewski et al. ................ 192/98 |
| 4,365,850 | 12/1982 | Perrichot et al. ............... 308/235 X |

FOREIGN PATENT DOCUMENTS

1028017 5/1966 United Kingdom .................. 192/98
1126058 9/1968 United Kingdom .

Primary Examiner—Rodney H. Bonck
Attorney, Agent, or Firm—Yuter, Rosen & Dainow

[57] ABSTRACT

In an antifriction-bearing throwout, particularly for automotive clutches, a clutch bearing with a non-rotating bearing-ring abuts in a radially slidable manner against a thrust plate of a sliding sleeve and is held in the centered position.

To facilitate centering of the clutch bearing in relation to the tongue ends of the clutch diaphragm-spring, and to prevent slip-through of the clutch bearing in the case of shock as by hard road-bumps, the non-rotating bearing-ring is arranged in a manner such that, overcoming a radially-acting friction force in relation to sliding sleeve, it can tilt in a circumferential direction, within certain limits, and can slide in a radial direction along two guide-surfaces that run parallel to one another.

14 Claims, 10 Drawing Figures

ANTIFRICTION-BEARING THROWOUT, PARTICULARLY FOR AUTOMOTIVE CLUTCHES

The present invention relates to antifriction bearings, and particularly to antifriction-bearing releases as for automotive clutches, constructed as a sliding sleeve and a clutch bearing. The clutch bearing abuts in a radially slidable manner with non-rotating bearing-ring against a thrust plate of the sliding sleeve and is provided with a construction for maintaining its centered position.

A self-centering clutch-bearing is known, as disclosed in U.K. Pat. No. 1,126,058 in which a spring is provided which acts on the non-rotating bearing-ring in the axial direction of the bearing support, so that, before and after disengagement, the clutch bearing is held in the centered position. This known design has the disadvantage that the axial tolerances of the components cause non-uniform frictional restraint, leading to centering effects that differ from one clutch bearing to another. Furthermore, additional springs to apply the axially-acting frictional force as well as specially designed housing components are required. As a result, the known design is relatively difficult to manufacture, and is thus expensive. Furthermore, the axially-acting springs cause an extremely pronounced damping of the radial motion of the bearing, which significantly hampers the self-centering of the clutch bearing, requiring several disengagements to complete. With hard road-bumps, the known clutch-bearing slips through in a downward direction, requiring new centering.

It is the object of the present invention to provide an easily assembled antifriction-bearing release for clutches of above-mentioned type.

It is the further object of the invention to provide a bearing which would consist of only a few parts, wherever the clutch bearing is held by uniformly acting frictional forces, and in which slip-through of the clutch bearing due to hard road bumps is largely prevented.

The foregoing objects are achieved in accordance with the invention by providing that the non-rotating bearing-ring is arranged in a manner such that, by overcoming a radially-acting frictional force in relation to the sliding sleeve, the bearing-ring can rotate with certain constraints in a circumferential direction, and can be slid in a radial direction along two guide-surfaces that run parallel to one another. This design of the clutch release allows the non-rotating bearing-ring of the clutch bearing to rotate with certain constraints in a circumferential direction during the rotation of the inner ring and then slide in a radial direction into alignment with the tongue ends of the clutch diaphragm-spring. If the guide surfaces are not oriented in a vertical direction, the centering process is followed by a positive-lock securing of the clutch bearing, by means of the guide surfaces themselves, so that slip-through of the clutch bearing is impossible even under hard road-bumps.

Further in accordance with the invention, the non-rotating bearing-ring features a bore in the shape of a longitudinal slot with two guide-surfaces that extend parallel to each other. The distance between the guide-surfaces is smaller than the diameter of the section of the element, such as the sliding sleeve, which engages this bore. With this design, no additional components are required, so that the antifriction-bearing release according to the invention is both inexpensive to manufacture and easily assembled. The radial interlocking of the sliding sleeve between the guide surfaces furthermore permits quick centering of the clutch bearing, without large constraining forces.

In accordance with a further advantageous development of the invention, there is provided, between the non-rotating bearing-ring and the cylindrical surface of the sliding sleeve or similar element, a U-shaped holding ring (which may be made of spring-steel), whose legs abut against the parallel guide-surfaces of the bearing-ring and of the circumferential surface of the sliding sleeve. This holding ring damps the relative motions of the clutch bearing in relation to the sliding sleeve.

In addition, according to the invention, it is advantageous to provide the non-rotating bearing-ring with an axially-directed projection that engages a slit-shaped opening in a flange part. This flange-part is arranged on the cylindrical surface of the sliding sleeve so it can rotate with certain constraints in a circumferential direction and thus abut with a small clearance against the inner surface of the non-rotating bearing-ring. Here, the flange-part also ensures the connection between the clutch bearing and the sliding sleeve.

In yet another advantageous form of embodiment, there is inserted in the bore of the outer ring an ovally-curved spring lock washer, preferably provided with a gap. The spring lock washer is supported on the bore surface of the outer ring via two diametrically opposed semicircularly curved sections and engages, with side surfaces that extend parallel to each other, an annular channel of the sliding sleeve.

The invention shall be explained in detail with the aid of the embodiments illustrated in the drawings, wherein.

Figure 1:
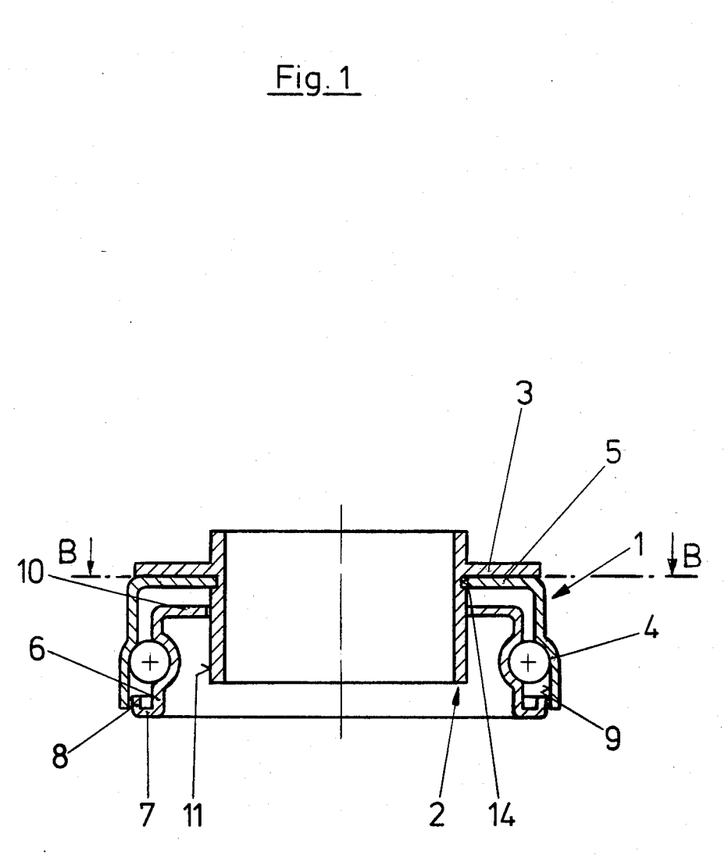
FIG. 1 shows an antifriction-bearing release for clutches in section (A—A according to FIG. 2), in which the non-rotating bearing-ring engages, with a flange that points radially inward, an annular channel on the cylindrical surface of the sliding sleeve.
Figure 2:
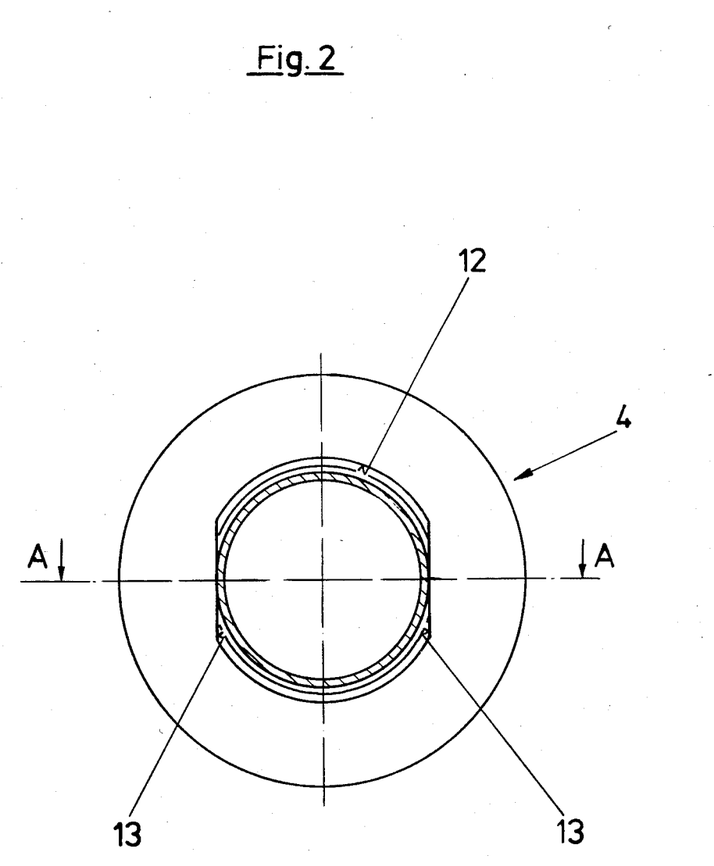
FIG. 2 illustrates a section B—B of the antifriction-bearing release according to FIG. 1.

The embodiment of the invention shown in FIGS. 1 and 2 has an antifriction-bearing release that consists of a clutch thrust-bearing 1 and a sliding sleeve 2. Sliding sleeve 2 is provided with a thrust plate 3, angled radially-outward and designed integrally with sliding sleeve 2, against which the sheet-metal outer ring 4 of clutch thrust-bearing 1, abuts in a radially slidable fashion. On the side facing the clutch, inner ring 6 features a flange 7, angled radially outward, against which abuts the clutch diaphragm-spring (not shown). Rim 8 of flange 7 is curved axially inward and faces (with a small clearance) bore-surface 9 of outer ring 4, so that the space between outer ring 4 and inner ring 6 is sealed on this side of clutch thrust-bearing 1. The sealing of this space on the side facing away from the clutch is effected by section 10, angled radially inward, of inner-ring 6, which section, except for a small gap G, extends all the way to cylindrical surface 11 of sliding sleeve 2. Outer ring 4 has a bore in the form of a longitudinal slot 12, see FIG. 2, with two parallel guide-surfaces 13, between which the sliding sleeve 2 is inserted with prestress. Overcoming a friction force, stationary outer-ring 4 may thus slide on guide surfaces 13 in a radial direction, and bearing ring 4 may thus slide on guide surfaces 13 in a radial direction, and bearing ring 4 may rotate in a circumferential direction with certain constraints, so that the bearing may slide in every radial direction and, without great constraining forces, may position itself precisely centrally to the tongue-ends of the clutch diaphragm-spring. Surprisingly, it was found that during the centering process, outer-ring 4 moves in the direction of rotation of inner-ring 6, or in the opposite direction, depending on the position of the axis offset, and then slides in a radial direction until it reaches a central position. No antitwist securing of the non-rotating outer-ring 4 is required, since it remains in the centered position. The resistance to twist increases with the size of the center offset between the clutch thrust-bearing and the clutch diaphgram-spring. For the fixation of the clutch thrust-bearing 1 on sliding-sleeve 2, the latter is provided with an annular channel 14 into which the outer-ring 4 is snapped.

Figure 3:
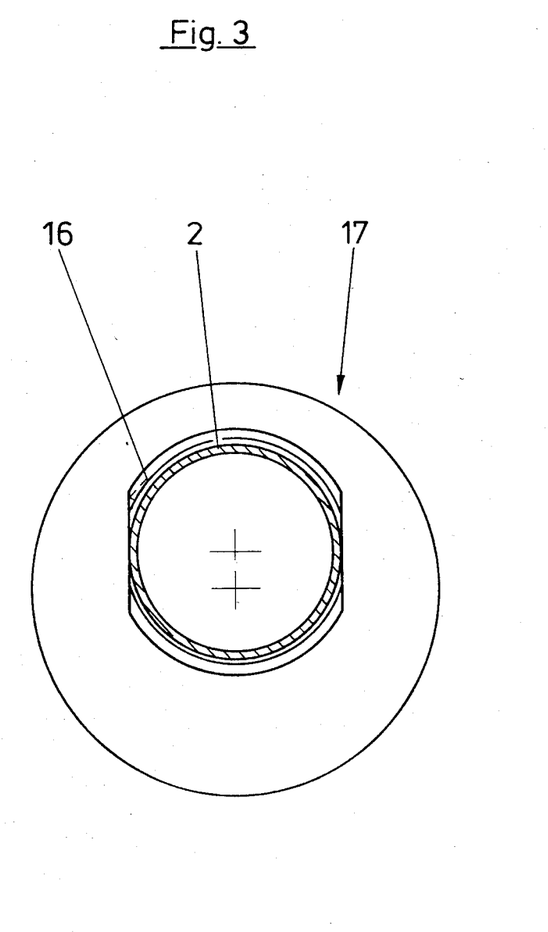
FIG. 3 provides a section through an antifriction-bearing release according to FIG. 2 with a sliding sleeve arranged in an eccentrically designed bore of the non-rotating bearing-ring.
Figure 4:
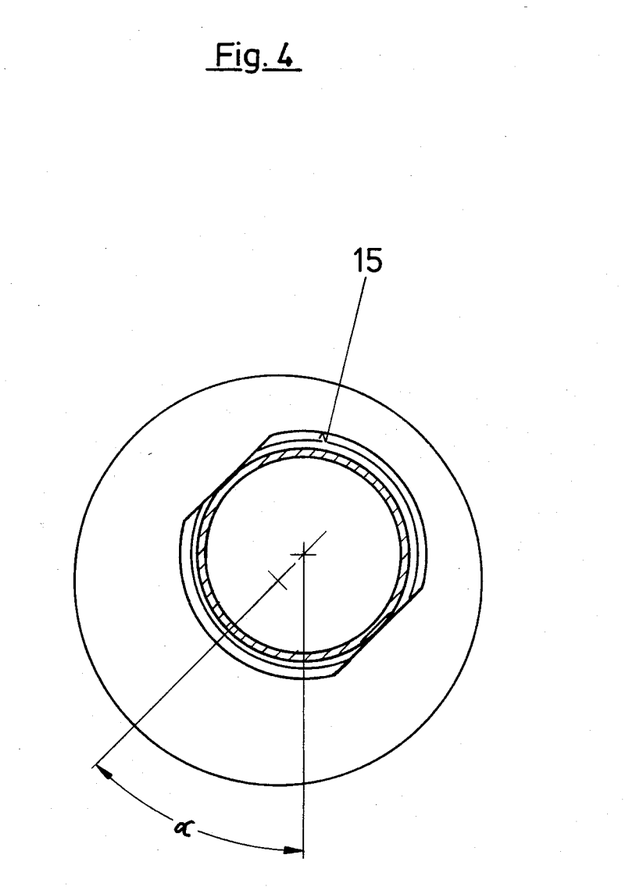
FIG. 4 diagrams a section through an antifriction-bearing release according to FIG. 3, in which the non-rotating bearing-ring is rotated by the angle alpha.

The design shown in FIGS. 3 and 4 differs from the embodiment just described only in that the bore in the shape of a longitudinal slit 15 with guide surfaces 16 is arranged eccentrically in outer ring 17.

Figure 5:
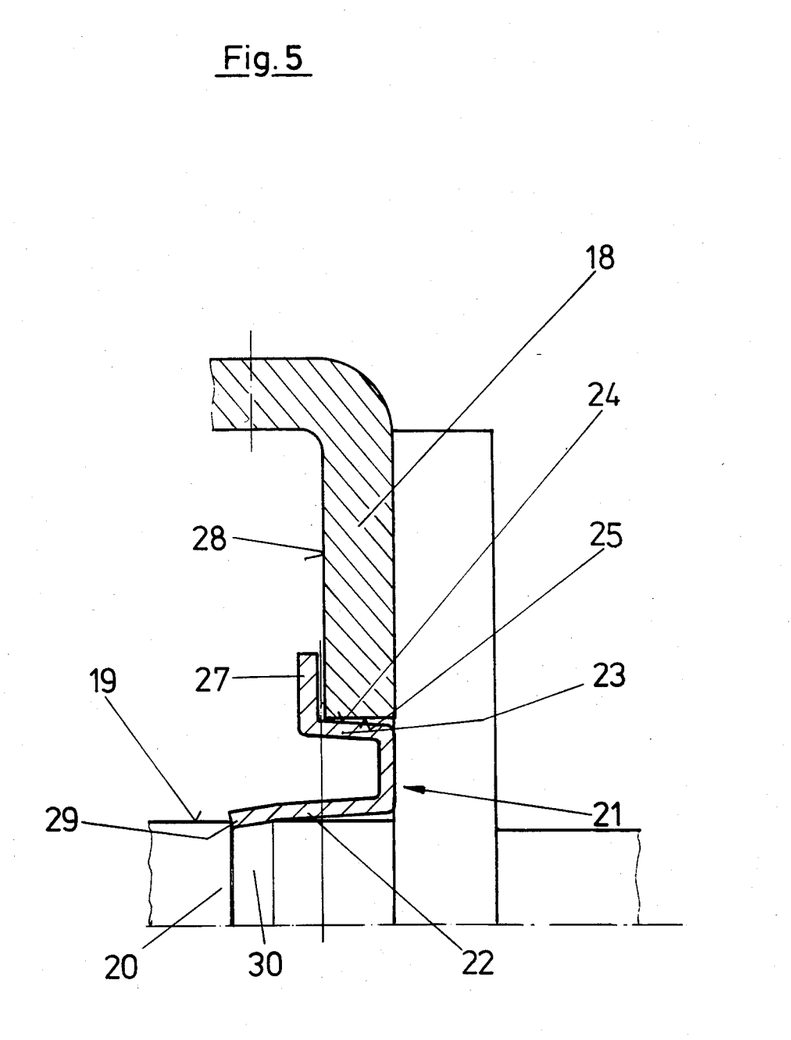
FIG. 5 shows part of an antifriction-bearing release according to the invention with a holding ring of U-shaped cross-section, inserted between the non-rotating bearing-ring and the sliding sleeve.
Figure 6:
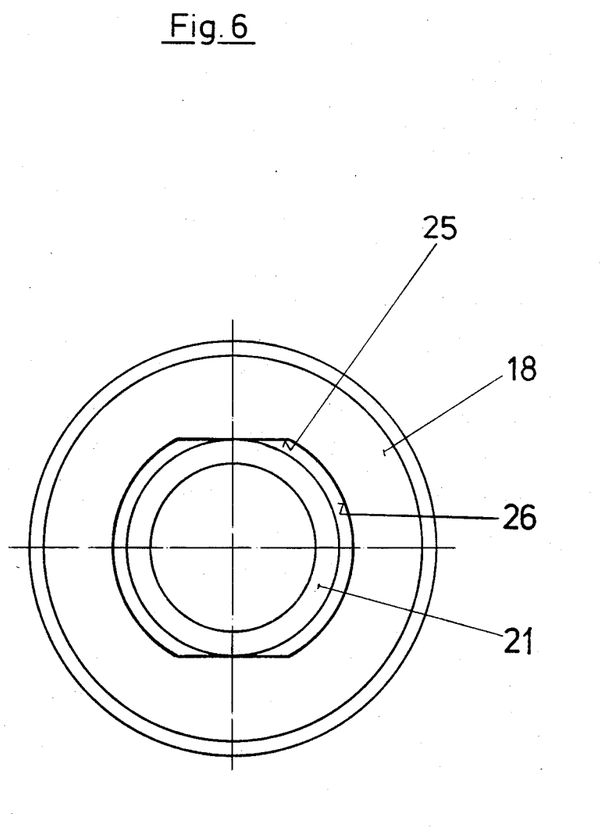
FIG. 6 illustrates a lateral view of an antifriction-bearing release according to FIG. 5, without sliding sleeve.

In the example of the embodiment according to FIGS. 5 and 6, a holding ring 21 of U-shaped cross-section with axially-oriented legs 22, 23 is inserted between stationary outer-ring 18 and cylindrical surface 19 of sliding sleeve 20. The outer cylindrical surface 24 of the holding ring 21 abuts with prestress against parallel guide-surfaces 25 in the bore, which guide surfaces are formed as longitudinal slots 26 in the outer ring 18, and with prestress against cylindrical surface 19 of sliding sleeve 20. In order to fix holding-ring 21 in one axial direction, the ring is provided with outwardly-angled lugs 27 which abut against inner front-surface 28 of outer-ring 18. Holding-ring 21, which may be made of spring steel, is fixed in the other axial direction by an edge 29 which is arranged at the outer margin of leg 22 and engages with spring-action into a recess 30 cut into the cylindrical surface of sliding sleeve 20. The clutch thrust-bearing is centered in relation to the ends of the clutch diaphragm-spring in the fashion already described for the examples of embodiment according to FIGS. 1 to 4. The outer-ring 18 turns if the inner ring rotates on the cylindrical surface 24 of holding-ring 21 and then slides in a radial direction up to the central position, while being elastically supported by guide-surfaces 25 on cylindrical-surface 24 of holding-ring 21.

Figure 7:
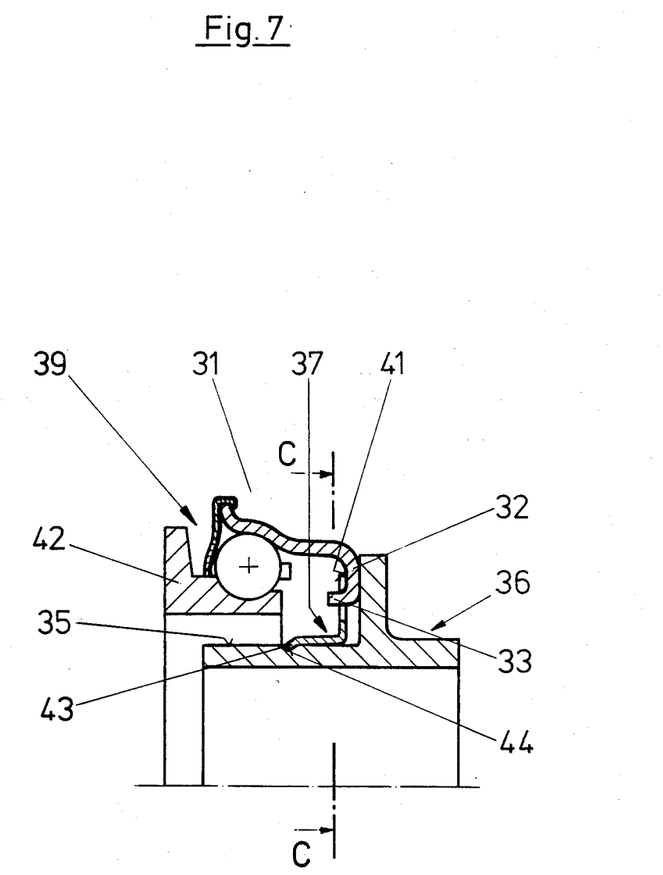
FIG. 7 shows another form of embodiment of an antifriction-bearing release according to the invention, in section, in which an axially-oriented projection of the outer ring engages the opening of a flange part that is connected with the sliding sleeve in a rotary fashion.
Figure 8:
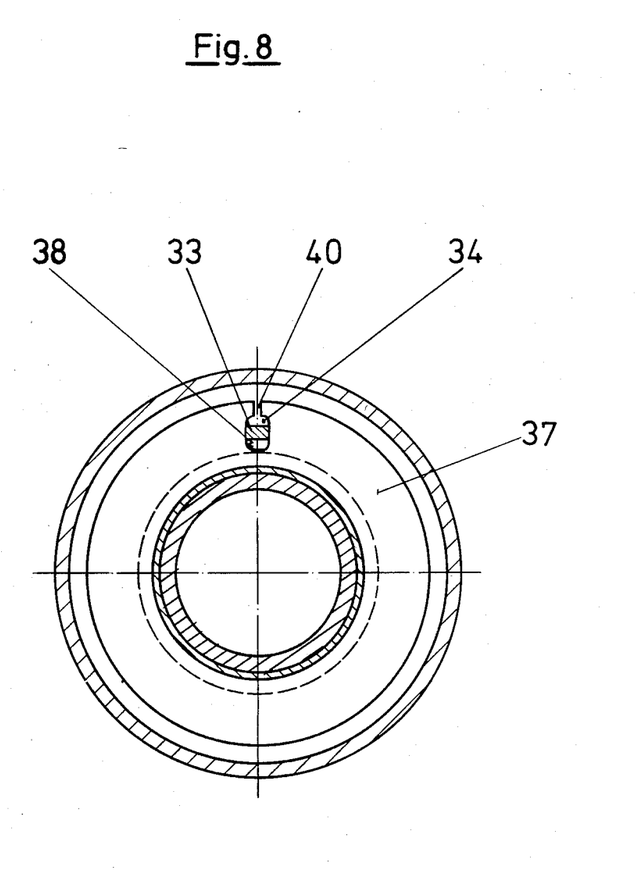
FIG. 8 is a diagram of a section C—C of the antifriction-bearing release according to FIG. 7.

FIGS. 7 and 8 shown an antifriction-bearing release in which the non-rotating bearing-ring 31 in the bore of flange 32 is provided with a projection 33 angled axially toward the clutch, which projection engages an opening 34 of flange-part 37. The flange-part 37 is arranged on the cylindrical surface 35 of sliding sleeve 36 and is made with an L-shaped cross-section. Projection 33 is restrained between the parallel-running guide-surfaces 38 of slit-shaped opening 34, in a manner such that clutch thrust-bearing 39, after overcoming a friction force, can slide in a radial direction. In the area of opening 34, flange-part 37 features at its outer rim a gap 40 that traverses to the outside, so that guide-suraces 38 may more easily move apart in spring-action. Flange-part 37 abuts with a small clearance against inner surface 41 of the non-rotating bearing-ring 31, and is arranged with radial prestress on cylindrical surface 35 of sliding surface 36. As a result, while inner-ring 42 rotates, non-rotating bearing-ring 31 has the capability, after overcoming a friction force between projection 33 and guide-surfaces 38, of moving in a radial direction into the centered position. The axial fixation of flange-part 37 is effected by holding-edge 43, which snaps into circumferential channel 44 when slipped onto the cylindrical surface of sliding sleeve 36.

Figure 9:
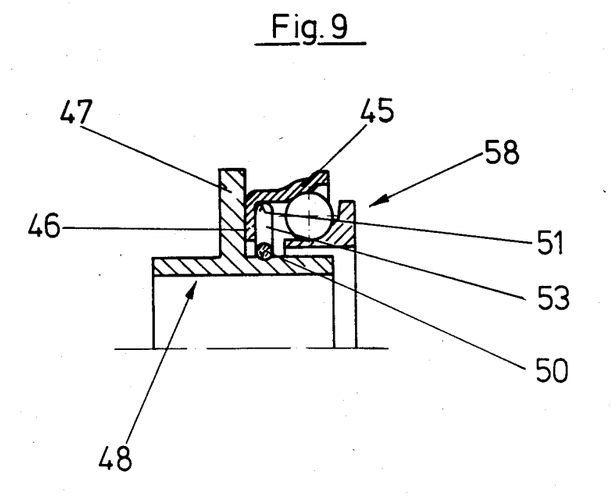
FIG. 9 illustrates a section through an antifriction-bearing release according to the invention, with an ovally-curved spring lock washer arranged in the non-rotating bearing-ring, which spring lock washer abuts with prestress against the cylindrical surface of the sliding sleeve.
Figure 10:
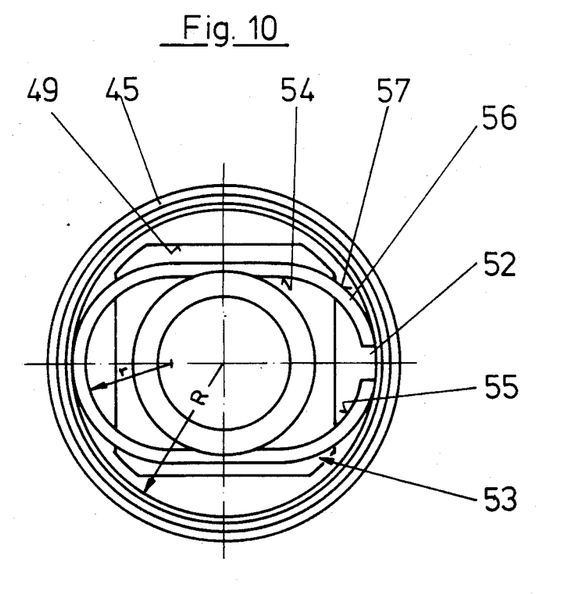
FIG. 10 provides a lateral view of the antifriction-bearing release shown in FIG. 9, from the right, without inner ring and rolling elements.

In the antifriction-bearing release shown in FIGS. 9 and 10, the non-rotating outer-ring 45 features a flange 46, angled radially inward, which abuts against thrust plate 47 of sliding sleeve 48. Sliding sleeve 48 engages the outer ring 45 with a larger clearance through a recess 49 cut into flange 46. A circumferential channel 50 is provided on its cylindrical surface. An ovally-curved spring lock washer 53 with a gap 52, having two lateral surfaces 54 that run parallel to each other and forming a bore in the shape of a longitudinal slit 55, is inserted in bore 51 of outer-ring 45. The spring lock washer is supported, via two diametrically opposed semicircularly curved sections 56, on bore-surface 51 of outer-ring 45. Radius R of outer-ring bore 51 and radius r of curved sections 56 of spring lock washer 53 and outer ring 45 there are generated selflocking wedge-surfaces 57 which secure the former against twisting in relation to outer-ring 45. The parallel-running lateral surfaces 54 of spring lock washer 53 engage in channel 50 of sliding-sleeve 48 and connect clutch-bearing 58 with sliding-sleeve 48. The distance between lateral surfaces 54 of spring lock washer 53, running parallel to each other, is smaller than the diameter of sliding-sleeve 48 in this area. Consequently, outer-ring 45, overcoming a radially-acting friction force in relation to sliding-sleeve 48, can be rotated within certain constraints in a circumferential direction and can be slid in a radial direction.

The invention is not limited by the examples of embodiment described above. The inner ring may be designed as the non-rotating bearing ring, without any difficulty. Furthermore, the bore for accommodating the sliding sleeve may be provided in a part connected with the non-rotating bearing-ring.

Other variations and modifications within the core of the invention will be apparent to those skilled in the art.

What is claimed is:

1. In an antifriction-bearing clutch release assembly, including a sliding sleeve having a thrust plate and a clutch bearing including a non-rotating bearing-ring, the non-rotating ring of said clutch bearing abutting said thrust plate in a radially slidable manner; the improvement comprising means for mounting said non-rotating bearing ring on said sliding sleeve and frictionally opposing relative rotation therebetween, whereby said non-rotating bearing-ring can rotate in a circumferential direction with respect to said sliding sleeve for substantially all circumferential displacement therebetween upon overcoming said friction opposition, and further comprising a pair of parallel guide surfaces positioned to enable said non-rotating bearing-ring to slide in a radial direction with respect to said sliding sleeve parallel to said guide surfaces.

2. The antifriction-bearing release of claim 1 wherein said non-rotating bearing-ring includes a bore in the form of a longitudinal slot, said sliding sleeve having means engaging said bore, said bore having two guide-surfaces that extend parallel to each other, spaced from each other by a distance smaller than the diameter of said engaging means.

3. The antifriction-bearing clutch release assembly of claim 1, wherein a holding ring is positioned between said non-rotating bearing-ring and a cylindrical circumferential surface of said sliding sleeve, said holding ring having a U-shaped cross-section, a first leg of said U-shaped cross-section abutting said parallel running guide surfaces, and a second leg thereof abutting against the circumferential-surface of said sliding sleeve.

4. The antifriction-bearing release of clutch release assembly of claim 3, wherein said holding ring is provided with lugs oriented radially outward, which abut against the inner side of said non-rotating bearing-ring.

5. The antifriction-bearing release clutch release assembly of claim 3, wherein said second leg is provided at its outer margin with an edge that engages a cut-out on said cylindrical surface of said sliding sleeve.

6. The antifriction-bearing release clutch release assembly according to claim 1, wherein said non-rotating bearing-ring is provided with an axially-oriented projection which engages a slit-shaped opening in a flange part, said flange-part being arranged on the cylindrical surface of said sliding sleeve so that said flange-part can rotate in a circumferential direction abutting with a small clearance against the inner surface of said non-rotating bearing-ring.

7. The antifriction-bearing clutch release assembly according to claim 6, wherein said flange-part includes, at the outer margin thereof, in the area of said slit-shaped opening, a gap extending from said slit-shaped opening to said outer margin.

8. The antifriction-bearing clutch release assembly of claim 6, wherein said flange part includes an axially oriented projection and said sliding sleeve includes a circumferential channel, said axially-oriented projection of said flange-part being provided with an edge that engages said circumferential channel around the cylindrical surface of sliding sleeve.

9. The antifriction-bearing clutch release assembly of claim 1, wherein said non-rotating bearing-ring is provided with a flange turned radially inward toward said sliding sleeve, and in the central bore of said flange, is provided with a projection directed axially toward the clutch, said projection engaging a slit-shaped opening in a flange-part, said flange-part being arranged on the outer cylindrical surface of said sliding sleeve so that said flange-part can rotate in a circumferential direction, said flange-part having an L-shaped cross-section and abutting with a small clearance against the inner surface of said non-rotating bearing-ring.

10. The antifriction-bearing clutch release assembly according to claim 1, wherein there is inserted, in the bore of said non-rotating bearing ring, an ovally-curved spring lock washer with side-surfaces running parallel to each other, said spring lock washer being supported on the bore surface of said non-rotating bearing ring via two diametrically opposed semicircularly-curved sections of said lock washer.

11. The antifriction-bearing clutch release assembly of claim 10, wherein the radius of the non-rotating bearing ring bore is greater than the radius of the semicircular-curved section of said spring lock washer.

12. The antifriction-bearing clutch release assembly of claim 10, wherein said spring lock washer is provided with a gap.

13. In an antifriction-bearing clutch release assembly, including a sliding sleeve having a thrust plate and a clutch bearing including a non-rotating bearing-ring, the non-rotating ring of said clutch bearing abutting said thrust plate in a radially slidable manner; the improvement comprising means for mounting said non-rotating bearing ring on said sliding sleeve and frictionally opposing relative rotation therebetween, whereby said non-rotating bearing-ring can rotate in a circumferential direction with respect to said sliding sleeve for substantially all circumferential displacement therebetween upon overcoming said friction opposition, and further comprising a pair of parallel guide surfaces positioned to enable said non-rotating bearing-ring to slide in a radial direction with respect to said sliding sleeve parallel to said guide surfaces, said non-rotating bearing-ring including a bore in the form of a longitudinal slot said sliding sleeve having means engaging said bore, said bore having two guide-surfaces that extend parallel to each other, spaced from each other by a distance smaller than the diameter of said engaging means said bore being eccentrically arranged in said non-rotating bearing-ring.

14. The antifriction-bearing release of claim 13, wherein said sliding sleeve includes an annular channel adapted to receive said non-rotating bearing-ring.

* * * * *

UNITED STATES PATENT AND TRADEMARK OFFICE
CERTIFICATE OF CORRECTION

PATENT NO. : 4,570,773

DATED : February 18, 1986

INVENTOR(S) : Horst M. Ernst, et al

It is certified that error appears in the above-identified patent and that said Letters Patent is hereby corrected as shown below:

Column 5, line 32, after "antifriction-bearing" omit -- release of --.

Column 5, line 36, delete "release" (first occurrence)

Column 5, line 40, delete "release" (first occurrence)

Signed and Sealed this

Thirteenth Day of October, 1987

Attest:

DONALD J. QUIGG

Attesting Officer

Commissioner of Patents and Trademarks